US012692419B2

(12) United States Patent
Min et al.

(10) Patent No.: US 12,692,419 B2
(45) Date of Patent: Jul. 28, 2026

(54) PRESSURE-SENSITIVE ADHESIVE

(71) Applicant: LG CHEM, LTD., Seoul (KR)

(72) Inventors: Jin Seo Min, Daejeon (KR); Hui Je Lee, Daejeon (KR); Hyun Woo Choi, Daejeon (KR); Jae Sung Hong, Daejeon (KR)

(73) Assignee: XINMEI FONTANA HOLDING (HONG KONG) LIMITED, Hong Kong (CN)

( * ) Notice: Subject to any disclaimer, the term of this patent is extended or adjusted under 35 U.S.C. 154(b) by 237 days.

(21) Appl. No.: 18/713,506

(22) PCT Filed: Nov. 25, 2022

(86) PCT No.: PCT/KR2022/018869

§ 371 (c)(1),
(2) Date: May 24, 2024

(87) PCT Pub. No.: WO2023/096413

PCT Pub. Date: Jun. 1, 2023

(65) Prior Publication Data

US 2025/0026966 A1 Jan. 23, 2025

(30) Foreign Application Priority Data

Nov. 25, 2021 (KR) ........................ 10-2021-0164029

(51) Int. Cl.
*C09J 7/20* (2018.01)
*C09J 7/38* (2018.01)
*C09J 133/06* (2006.01)
*C09J 133/08* (2006.01)

(52) U.S. Cl.
CPC ................. *C09J 7/385* (2018.01); *C09J 7/20* (2018.01); *C09J 133/066* (2013.01); *C09J 133/08* (2013.01); *C09J 2301/124* (2020.08); *Y10T 428/2891* (2015.01)

(58) Field of Classification Search
None
See application file for complete search history.

(56) References Cited

U.S. PATENT DOCUMENTS

| | | | | |
|---|---|---|---|---|
| 5,648,425 A * | 7/1997 | Everaerts | ................. | C09J 7/385 525/329.2 |
| 2021/0246338 A1* | 8/2021 | Takarada | ................. | C09J 7/385 |
| 2022/0332989 A1 | 10/2022 | Park et al. | | |

FOREIGN PATENT DOCUMENTS

| | | | | |
|---|---|---|---|---|
| JP | 2008-222754 A | 9/2008 | | |
| JP | 2020-109177 A | 7/2020 | | |
| JP | 2021-161377 A | 10/2021 | | |
| KR | 2016-0083583 A | 7/2016 | | |
| KR | 10-2024081 B1 | 9/2019 | | |
| KR | 2019-0124137 A | 11/2019 | | |
| KR | 2021-0025056 A | 3/2021 | | |
| KR | 2021-0057045 A | 5/2021 | | |
| KR | 2021-0073479 A | 6/2021 | | |
| WO | 2019-065375 A1 | 4/2019 | | |
| WO | 2019-244499 A1 | 12/2019 | | |
| WO | 2020-054745 A1 | 3/2020 | | |
| WO | WO-2020158484 A1 * | 8/2020 | ............... | G02B 5/30 |

OTHER PUBLICATIONS

Translation of KR 1020210025056, Mar. 8, 2021 (Year: 2021).*
Translation of KR 1020160083583, Jul. 12, 2016 (Year: 2016).*
International Search Report issued for International Application No. PCT/KR2022/018869 on Mar. 10, 2023, 9 pages.

* cited by examiner

*Primary Examiner* — Anish P Desai
(74) *Attorney, Agent, or Firm* — Ricky Lam

(57) ABSTRACT

The present application may provide a pressure-sensitive adhesive with excellent reliability, which is applied to a flexible device, thereby effectively responding to repeated deformation and recovery, causing no defects (for example, observation of deformation traces and the like) before and after deformation, having excellent cuttability, workability, and recoverability, and causing no lifting, delamination, and/or bubble generation. The present application may also provide a pressure-sensitive adhesive film or an optical film, and a flexible device such as a foldable device or a rollable device, comprising the pressure-sensitive adhesive.

13 Claims, 1 Drawing Sheet

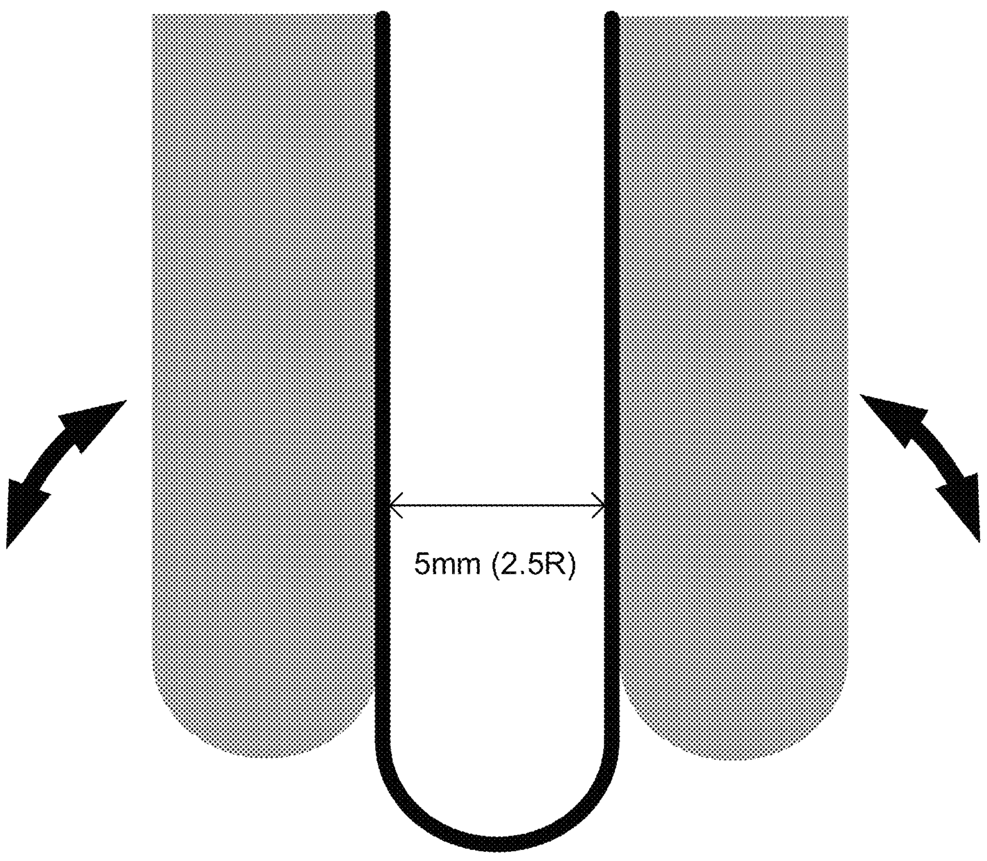
5mm (2.5R)

PRESSURE-SENSITIVE ADHESIVE

This application is a 35 U.S.C. § 371 National Phase Entry Application from PCT/KR2022/018869, filed on Nov. 25, 2022, which claims the benefit of priority based on Korean Patent Application No. 10-2021-0164029 dated Nov. 25, 2021, the disclosures of which are incorporated herein by reference in their entireties.

TECHNICAL FIELD

The present application relates to a pressure-sensitive adhesive.

BACKGROUND

A flexible device is a new conceptual device, and in an example thereof, a so-called foldable device or rollable device, and the like is included.

The pressure-sensitive adhesive applied to the foldable device is repeatedly folded and then unfolded, or wound and then unwound. Therefore, the pressure-sensitive adhesive applied to the flexible device is required to be capable of effectively following the repeated deformation, and recovering to its original shape when the force applied during the deformation disappears.

In general, it is known that the lower the elastic modulus of the pressure-sensitive adhesive, particularly, the lower the elastic modulus at a low temperature, the more effectively it is to follow the repeated deformation.

However, if the elastic modulus of the pressure-sensitive adhesive layer is too low, there are problems that recovery characteristics are deteriorated when the applied force for deformation disappears, cuttability and workability are deteriorated, and it is difficult to secure reliability when applied to devices.

Therefore, it is not easy to obtain a pressure-sensitive adhesive that effectively follows repeated deformation while satisfying cuttability, workability, reliability, and recoverability.

Depending on the design of the flexible device, a so-called thick-film pressure-sensitive adhesive that is thicker than the conventional adhesive may be required as the pressure-sensitive adhesive. However, it is an uneasy task to satisfy physical properties required for the flexible device while forming a thick pressure-sensitive adhesive.

DETAILED DESCRIPTION

Technical Problem

The present application relates to a pressure-sensitive adhesive and a use thereof. It is one object of the present application to provide a pressure-sensitive adhesive suitable for a foldable device. In one example, it is one object of the present application to provide a pressure-sensitive adhesive also securing cuttability, workability, recoverability, and reliability while securing elastic properties suitable for a foldable device simultaneously.

The present application is intended to provide a pressure-sensitive adhesive capable of satisfying the above physical properties even when the relatively thick pressure-sensitive adhesive is formed.

Technical Solution

Among the physical properties mentioned in this specification, when the measured temperature affects the relevant physical property, the physical property is a physical property measured at room temperature, unless otherwise specified.

In this specification, the term room temperature is a temperature in a state where it is not particularly warmed and cooled, which may mean any one temperature within the range of about 10° C. to 30° C., for example, a temperature of about 27° C. or less while being about 15° C. or more, 18° C. or more, 20° C. or more, or about 23° C. or more. In addition, unless otherwise specified, the unit of temperature mentioned in this specification is ° C.

Among the physical properties mentioned in this specification, when the measured pressure affects the relevant physical property, the physical property is a physical property measured at normal pressure, unless otherwise specified.

In this specification, the term normal pressure is a pressure in a state where it is not particularly pressurized and depressurized, which usually means a pressure of about 700 mmHg to 800 mmHg or so, which is the atmospheric pressure level.

Among the physical properties mentioned in this specification, when the measured humidity affects the relevant physical property, the physical property is a physical property measured at natural humidity in the state of the room temperature and normal pressure, unless otherwise specified.

The present application relates to a pressure-sensitive adhesive. The pressure-sensitive adhesive of the present application may comprise a pressure-sensitive adhesive polymer.

As the pressure-sensitive adhesive polymer, any polymer known in the industry to be capable of forming the pressure-sensitive adhesive may be used. The pressure-sensitive adhesiveness, as is well known, means the property that is agglutinable and peelable by applying pressure at room temperature without using water, solvents, or heat, and the like.

In one example, the pressure-sensitive adhesive polymer may be an acrylic copolymer.

In this specification, the term copolymer means a resulting product of a polymerization reaction of a monomer mixture.

In this specification, the term monomer unit means the state of the monomer after the polymerization reaction.

In this specification, the term acrylic copolymer is a copolymer comprising an acrylic monomer unit as a main component. In this specification, the matter that a component is included as a main component means that the content of the component is above a certain level. For example, in the case where the acrylic monomer unit is the main component in the acrylic copolymer, the lower limit of the ratio may be 55 wt %, 60 wt %, 65 wt %, 70 wt %, 75 wt %, 80 wt %, 85 wt %, 90 wt %, or 95 wt % or so, and the upper limit thereof may be 100 wt % or so. The content may be more than or equal to, or more than any one of the above-described lower limits, or may be in a range of less than or equal to, or less than the above-described upper limit while being more than or equal to, or more than any one of the above-described lower limits.

In this specification, the term acrylic monomer means acrylic acid, methacrylic acid, acrylic acid ester or methacrylic acid ester.

In this specification, the term (meth)acrylic means acrylic or methacrylic, or a mixture thereof.

In the case where the pressure-sensitive adhesive polymer in the pressure-sensitive adhesive of the present application is cross-linkable, the polymer in the pressure-sensitive adhesive may be in a state after cross-linking. Such a pressure-sensitive adhesive may be formed, for example, by cross-linking a pressure-sensitive adhesive composition comprising the pressure-sensitive adhesive polymer.

The pressure-sensitive adhesive may comprise the pressure-sensitive adhesive polymer as the main component. For example, the lower limit of the ratio of the pressure-sensitive adhesive polymer in the pressure-sensitive adhesive composition may be 55 wt %, 60 wt %, 65 wt %, 70 wt %, 75 wt %, 80 wt %, 85 wt %, 90 wt %, 95 wt %, 97 wt %, or 99 wt % or so, and the upper limit thereof may be, for example, 100 wt % or so. The content may be more than or equal to, or more than any one of the above-described lower limits, or may be in a range of less than or equal to, or less than the above-described upper limit while being more than or equal to, or more than any one of the above-described lower limits.

The pressure-sensitive adhesive of the present application may exhibit a low storage elastic modulus at a low temperature.

For example, the upper limit of the storage elastic modulus of the pressure-sensitive adhesive at −20° C. may be 100,000 Pa, 98,000 Pa, 96,000 Pa, 94,000 Pa, 92,000 Pa, 90,000 Pa, 88,000 Pa, 86,000 Pa, or 85,000 Pa or so, and the lower limit thereof may be 70,000 Pa, 72,000 Pa, 74,000 Pa, 76,000 Pa, 78,000 Pa, 80,000 Pa, 82,000 Pa, 84,000 Pa, 86,000 Pa, 88,000 Pa, 90,000 Pa, 92,000 Pa, or 94,000 Pa or so. The storage elastic modulus may be less than or equal to, or less than any one of the above-described upper limits, or may be in a range of less than or equal to, or less than any one of the above-described upper limits while being more than or equal to, or more than any one of the above-described lower limits. The storage elastic modulus is a value measured according to the storage elastic modulus measurement method (temperature sweep) described in Examples of this specification.

The lower the storage elastic modulus of the pressure-sensitive adhesive at a low temperature is, the better the property of following repeated deformation is, but an excessively low storage elastic modulus is disadvantageous to the cuttability, workability, recoverability, and reliability, and the like of the pressure-sensitive adhesive. Accordingly, the storage elastic modulus may be in a range of less than or equal to, or less than any one of the above-described upper limits while being more than or equal to, or more than any one of the above-described lower limits. As the pressure-sensitive adhesive exhibits a storage elastic modulus at −20° C. in the above range, it is applied to a flexible device, whereby it is possible to effectively respond to repeated deformation and recovery, and it is also possible to properly secure workability, cuttability, recoverability, and reliability.

The pressure-sensitive adhesive of the present application may exhibit a relatively low storage elastic modulus as above at a low temperature and simultaneously exhibit a storage elastic modulus of a certain level or more at a relatively high temperature. The storage elastic modulus of the pressure-sensitive adhesive is a temperature-defendant function, and usually, when the temperature increases, the storage elastic modulus decreases. Therefore, the storage elastic modulus of the pressure-sensitive adhesive at high temperatures is usually lower than the storage elastic modulus at low temperatures. However, when the pressure-sensitive adhesive has a low storage elastic modulus at a low temperature, the storage elastic modulus at a high temperature is also relatively lowered, so that the storage elastic modulus at a high temperature of the pressure-sensitive adhesive having a low storage elastic modulus at a low temperature is lower than the storage elastic modulus at a high temperature of the pressure-sensitive adhesive having a high storage elastic modulus at a low temperature.

However, in the present application, it may exhibit a relatively high storage elastic modulus at a high temperature together with the low storage elastic modulus at a low temperature. That is, the pressure-sensitive adhesive of the present application may exhibit a relatively gentle slope in the graph of the storage elastic modulus according to temperature.

For example, the pressure-sensitive adhesive of the present application may have an absolute value of the change rate ΔG1' according to Equation 1 below in a predetermined range.

$$\Delta G1' = (G'_{25} - G'_{-20})/45 \qquad \text{[Equation 1]}$$

In Equation 1, $G'_{25}$ is the storage elastic modulus of the pressure-sensitive adhesive at 25° C., and $G'_{-20}$ is the storage elastic modulus of the pressure-sensitive adhesive at −20° C. The storage elastic modulus is a value measured according to the storage elastic modulus measurement method (temperature sweep) described in Examples of this specification.

The upper limit of the change rate ΔG1' may be 1,700, 1,650, 1,600, 1,550, 1,500, 1,450, 1,400, or 1,370 or so, and the lower limit thereof may be 800, 900, 1,000, 1,100, 1,200, 1,300, 1,400, 1,500, or 1,600 or so. The ΔG1' may be less than or equal to, or less than any one of the above-described upper limits, or may be in a range of less than or equal to, or less than any one of the above-described upper limits while being more than or equal to, or more than any one of the above-described lower limits.

The pressure-sensitive adhesive exhibiting such a change rate can effectively follow the repeated deformation and recovery in a foldable device, and can also maintain excellent workability, cuttability, recoverability, and reliability. As described above, the pressure-sensitive adhesive having a low elastic modulus at a low temperature exhibits a relatively low elastic modulus even at a high temperature, so that it is an uneasy task to satisfy the change rate. In the present application, by applying a predetermined acrylic copolymer to be described below as the pressure-sensitive adhesive polymer, it is possible to satisfy such a change rate.

ΔG1' in Equation 1 may be a negative number.

The storage elastic modulus of the pressure-sensitive adhesive at 25° C. may also be within a predetermined range. The storage elastic modulus is a value measured according to the storage elastic modulus measurement method (temperature sweep) described in Examples of this specification. For example, the lower limit of the storage elastic modulus at 25° C. may be 10,000 Pa, 12,000 Pa, 14,000 Pa, 16,000 Pa, 18,000 Pa, 20,000 Pa, 22,000 Pa, 24,000 Pa, 26,000 Pa, 28,000 Pa, or 30,000 Pa or so, and the upper limit thereof may also be 100,000 Pa, 98,000 Pa, 96,000 Pa, 94,000 Pa, 92,000 Pa, 90,000 Pa, 88,000 Pa, 86,000 Pa, 84,000 Pa, 82,000 Pa, 80,000 Pa, 78,000 Pa, 76,000 Pa, 74,000 Pa, 72,000 Pa, 70,000 Pa, 68,000 Pa, 66,000 Pa, 64,000 Pa, 62,000 Pa, 60,000 Pa, 58,000 Pa, 56,000 Pa, 54,000 Pa, 52,000 Pa, 50,000 Pa, 48,000 Pa, 46,000 Pa, 44,000 Pa, 42,000 Pa, 40,000 Pa, 38,000 Pa, 36,000 Pa, 34,000 Pa, 32,000 Pa, 30,000 Pa, 28,000 Pa, 26,000 Pa, or 24,000 Pa or so. The storage elastic modulus may be more than or equal to, or more than any one of the above-described lower limits, or may be in a range of less than or equal to, or less than the above-described upper limit while being more than or equal to, or more than any one of the above-described lower limits.

The pressure-sensitive adhesive may have an absolute value of the change rate ΔG2' according to Equation 2 below within a predetermined range.

$$\Delta G2' = (G'_{60} - G'_{-20})/80 \quad \text{[Equation 2]}$$

In Equation 1, $G'_{60}$ is the storage elastic modulus of the pressure-sensitive adhesive at 60° C., and $G'_{-20}$ is the storage elastic modulus of the pressure-sensitive adhesive at −20° C. The storage elastic modulus is a value measured according to the storage elastic modulus measurement method (temperature sweep) described in Examples of this specification.

The upper limit of the change rate ΔG2' may be 2,000, 1,500, 1,000, 950, 900, or 870 or so, and the lower limit thereof may also be 400, 500, 600, 700, 800, 850, 900, or 950 or so. The ΔG2' may be less than or equal to, or less than any one of the above-described upper limits, or may be in a range of less than or equal to, or less than any one of the above-described upper limits while being more than or equal to, or more than any one of the above-described lower limits.

The pressure-sensitive adhesive exhibiting such a change rate can effectively follow repeated deformation and recovery in a foldable device, and can also maintain excellent workability, cuttability, recoverability, and reliability.

ΔG2' in Equation 2 may be a negative number.

The storage elastic modulus of the pressure-sensitive adhesive at 60° C. may be within a predetermined range. The storage elastic modulus is a value measured according to the storage elastic modulus measurement method (temperature sweep) described in Examples of this specification. The lower limit of the storage elasticity at 60° C. may be 5,000 Pa, 10,000 Pa, 12,000 Pa, 14,000 Pa, 16,000 Pa, 18,000 Pa, 20,000 Pa, or 22,000 Pa or so, and the upper limit thereof may also be 100,000 Pa, 98,000 Pa, 96,000 Pa, 94,000 Pa, 92,000 Pa, 90,000 Pa, 88,000 Pa, 86,000 Pa, 84,000 Pa, 82,000 Pa, 80,000 Pa, 78,000 Pa, 76,000 Pa, 74,000 Pa, 72,000 Pa, 70,000 Pa, 68,000 Pa, 66,000 Pa, 64,000 Pa, 62,000 Pa, 60,000 Pa, 58,000 Pa, 56,000 Pa, 54,000 Pa, 52,000 Pa, 50,000 Pa, 48,000 Pa, 46,000 Pa, 44,000 Pa, 42,000 Pa, 40,000 Pa, 38,000 Pa, 36,000 Pa, 34,000 Pa, 32,000 Pa, 30,000 Pa, 28,000 Pa, 26,000 Pa, 24,000 Pa, 22,000 Pa, 20,000 Pa, 18,000 Pa, or 16,000 Pa or so. The storage elastic modulus may be more than or equal to, or more than any one of the above-described lower limits, or may be in a range of less than or equal to, or less than the above-described upper limit while being more than or equal to, or more than any one of the above-described lower limits.

The pressure-sensitive adhesive of the present application may have an absolute value of the change rate ΔG3' according to Equation 3 below within a predetermined range.

$$\Delta G3' = (G'_{60} - G'_{25})/35 \quad \text{[Equation 3]}$$

In Equation 3, $G'_{60}$ is the storage elastic modulus of the pressure-sensitive adhesive at 60° C., and $G'_{25}$ is the storage elastic modulus of the pressure-sensitive adhesive at 25° C. The storage elastic modulus is a value measured according to the storage elastic modulus measurement method (temperature sweep) described in Examples of this specification.

The upper limit of the change rate ΔG3' may be 1,000, 950, 900, 850, 800, 750, 700, 650, 600, 550, 500, 450, 400, 350, 300, or 250 or so, and the lower limit thereof may also be 50, 100, 150, or 200 or so. The ΔG3' may be less than or equal to, or less than any one of the above-described upper limits, or may be in a range of less than or equal to, or less than any one of the above-described upper limits while being more than or equal to, or more than any one of the above-described lower limits.

The pressure-sensitive adhesive exhibiting such a change rate can effectively follow repeated deformation and recovery in a foldable device, and can also maintain excellent workability, cuttability, recoverability, and reliability.

ΔG3' in Equation 3 may be a negative number.

In the case of designing a pressure-sensitive adhesive to have the above characteristics, it is possible to provide a pressure-sensitive adhesive having excellent workability, cuttability, recoverability, and reliability while securing desired characteristics, that is, characteristics required for a flexible device.

Particularly, by satisfying the physical properties, even when the relatively thick pressure-sensitive adhesive is formed, it is possible to provide a pressure-sensitive adhesive having excellent properties, workability, cuttability, recoverability, and reliability required for the flexible device.

For example, the pressure-sensitive adhesive may be formed such that TM according to Equation 4 below is within a predetermined range.

$$TM = D/G'_{-20} \quad \text{[Equation 4]}$$

In Equation 4, D is the thickness of the pressure-sensitive adhesive (unit: 400 μm), and $G'_{-20}$ is the storage elastic modulus (unit: MPa) of the pressure-sensitive adhesive at −20° C.

For example, in the pressure-sensitive adhesive, the lower limit of TM according to Equation 4 may be 400 μm $MPa^{-1}$, 450 μm $MPa^{-1}$, 500 μm $MPa^{-1}$, 550 μm $MPa^{-1}$, 600 μm $MPa^{-1}$, 650 μm $MPa^{-1}$, 700 μm $MPa^{-1}$, 750 μm $MPa^{-1}$, 800 μm $MPa^{-1}$, 850 μm $MPa^{-1}$, 900 μm $MPa^{-1}$, 950 μm $MPa^{-1}$, 1,000 μm $MPa^{-1}$, or 1,050 μm $MPa^{-1}$ or so, and the upper limit thereof may be 2,000 μm $MPa^{-1}$, 1,800 μm $MPa^{-1}$, 1,600 μm $MPa^{-1}$, 1,400 μm $MPa^{-1}$, 1,200 μm $MPa^{-1}$, or 1.100 μm $MPa^{-1}$ or so. The TM may be more than or equal to, or more than any one of the above-described lower limits, or may be in a range of less than or equal to, or less than the above-described upper limit while being more than or equal to, or more than any one of the above-described lower limits.

In the present application, in order to form such a pressure-sensitive adhesive, a specific acrylic copolymer is applied as the pressure-sensitive adhesive polymer.

For example, as the acrylic copolymer, an acrylic copolymer exhibiting crystallinity may be applied. In the present application, the matter that the acrylic copolymer exhibits crystallinity means that a melting point (Tm) is confirmed in the DSC (Differential Scanning Calorimeter) measurement method described in Examples of this specification. In this specification, melting point and melting temperature have the same meaning.

The acrylic copolymers are generally amorphous copolymers. In the present application, crystallinity is imparted to the copolymer through control of the monomer unit of the acrylic copolymer.

Particularly, in the present application, as the acrylic copolymer, a copolymer having a glass transition temperature (Tg) and a melting point simultaneously may be used, thereby effectively forming a desired pressure-sensitive adhesive. Here, the matter of having the glass transition temperature and the melting point simultaneously means that the glass transition temperature and the melting point are simultaneously confirmed in the DSC (Differential Scanning Calorimeter) measurement method.

In order to secure desired properties, the melting point and the glass transition temperature may be adjusted.

For example, the upper limit of the glass transition temperature of the acrylic copolymer may be −30° C., −35° C., −40° C., −45° C., −50° C., −55° C., or −60° C. or so, and the lower limit thereof may also be −10° C., −15° C., −20° C., −25° C., −30° C., −35° C., −40° C., −45° C., −50° C., −55° C., or −60° C. or so. The glass transition temperature may be more than or equal to, or more than any one of the above-described lower limits, or may be less than or equal to, or less than any one of the above-described upper limits, or may be in a range of less than or equal to, or less than any one of the above-described upper limits while being more than or equal to, or more than any one of the above-described lower limits.

The lower limit of the melting point of the acrylic copolymer may be −10° C., −15° C., −20° C., −25° C., −30° C., −35° C., or −40° C. or so, and the upper limit thereof may be −5° C., −10° C., −15° C., −20° C., −25° C., −30° C., −35° C., or −40° C. or so. The melting point may be more than or equal to, or more than any one of the above-described lower limits, or may be less than or equal to, or less than any one of the above-described upper limits, or may be in a range of less than or equal to, or less than any one of the above-described upper limits while being more than or equal to, or more than any one of the above-described lower limits.

A difference between the melting point (Tm) and the glass transition temperature (Tg) of the acrylic copolymer may be within a predetermined range. The difference is a value (Tm−Tg) obtained by subtracting the glass transition temperature (Tg) from the melting point (Tm). The lower limit of the difference (Tm−Tg) may be, for example, 5° C., 7° C., 9° C., 10° C., 11° C., 13° C., 15° C., 17° C., 19° C., 20° C., 22° C., 25° C., 27° C., 30° C., 32° C., 35° C., 37° C., or 40° C. or so, and the upper limit thereof may also be 100° C., 95° C., 90° C., 85° C., 80° C., 75° C., 70° C., 65° C., 60° C., 55° C., 50° C., 45° C., 40° C., 35° C., 30° C., 25° C., or 20° C. or so. The difference (Tm−Tg) may be more than or equal to, or more than any one of the above-described lower limits, or may be less than or equal to, or less than any one of the above-described upper limits, or may be in a range of less than or equal to, or less than any one of the above-described upper limits while being more than or equal to, or more than any one of the above-described lower limits.

Through the application of an acrylic copolymer exhibiting these properties, it is possible to efficiently secure desired properties.

The acrylic copolymer may comprise at least an alkyl (meth)acrylate unit, a unit of Formula 1 below, and a polar functional group-containing unit.

Here, the unit means a monomer unit.

[Formula 1]

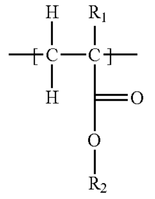

In Formula 1, $R_1$ represents hydrogen or an alkyl group, and $R_2$ represents an alkyl group with 11 to 13 carbon atoms.

The acrylic copolymer containing the above monomer units is effective in forming a desired pressure-sensitive adhesive.

The acrylic copolymer may be formed of the above-described crystalline copolymer under a predetermined ratio of the unit of Formula 1 and/or the polar functional group-containing unit, or maybe formed of a copolymer having properties similar thereto.

For example, when the unit of Formula 1 above is present in a predetermined ratio, and in some cases, when the unit of Formula 1 above interacts with the polar functional group present in a predetermined ratio, such a copolymer may exhibit crystallinity, or may exhibit at least properties similar to crystallinity. As such, when a copolymer having crystallinity or exhibiting properties similar to crystallinity is applied, the pressure-sensitive adhesive having the above-described properties can be efficiently formed. Therefore, it is possible to effectively form a pressure-sensitive adhesive exhibiting the above-described elastic modulus characteristics through the pressure-sensitive adhesive to which such a copolymer is applied.

As the alkyl (meth)acrylate unit contained in the copolymer, for example, a unit derived from an alkyl (meth) acrylate having an alkyl group with 1 to 10 carbon atoms may be used. In another example, the alkyl group may be an alkyl group with 2 to 20 carbon atoms, 3 to 10 carbon atoms, 4 to 10 carbon atoms, 4 to 10 carbon atoms, 4 to 9 carbon atoms, or 4 to 8 carbon atoms. The alkyl group may be linear or branched, which may be substituted or unsubstituted. In one example, the unit may be formed using an alkyl (meth) acrylate having an unsubstituted alkyl group while being linear or branched as the alkyl group.

An example of the alkyl (meth)acrylate may be exemplified by methyl (meth)acrylate, ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, isononyl (meth)acrylate, n-octyl (meth)acrylate or isooctyl (meth)acrylate, and the like, but is not limited thereto.

The lower limit of the ratio of the alkyl (meth)acrylate unit in the acrylic copolymer is 5 wt %, 10 wt %, 15 wt %, 20 wt %, 25 wt %, 30 wt %, 35 wt %, or 40 wt % or so, and the upper limit thereof may be 70 wt %, 65 wt %, 60 wt %, 55 wt %, 50 wt %, 45 wt %, 40 wt %, 35 wt %, 30 wt %, 25 wt %, or 20 wt % or so. The ratio may be more than or equal to, or more than any one of the above-described lower limits, or may be less than or equal to, or less than any one of the above-described upper limits, or may be in a range of less than or equal to, or less than any one of the above-described upper limits while being more than or equal to, or more than any one of the above-described lower limits. Within this range, it is possible to effectively form a desired pressure-sensitive adhesive.

The polar functional group-containing unit is a unit formed of a monomer having a polar functional group. Such a monomer usually comprises a polymerizable group (e.g., a carbon-carbon double bond) and a polar functional group simultaneously.

The monomer having a polar functional group may include a hydroxyl group-containing monomer, a carboxyl group-containing monomer, and a nitrogen-containing monomer, and the like, ad in the present application, it is particularly advantageous to apply a hydroxyl group-containing monomer, but is not limited thereto.

The hydroxyl group-containing monomer may include 2-hydroxyethyl (meth)acrylate, 2-hydroxypropyl (meth) acrylate, 4-hydroxybutyl (meth)acrylate, 6-hydroxyhexyl (meth)acrylate, 8-hydroxyoctyl (meth)acrylate, 2-hydroxypolyethylene glycol (meth)acrylate, or 2-hydroxypolypropylene glycol (meth)acrylate, and the like; an example of the carboxyl group-containing monomer may include (meth) acrylic acid, 2-(meth)acryloyloxyacetic acid, 3-(meth)acryloyloxypropyl acid, 4-(meth)acryloyloxybutyric acid, acrylic acid dimer, itaconic acid, maleic acid and maleic acid anhydride, and the like; and an example of the nitrogen-containing monomer may include (meth)acrylamide, N-vinyl pyrrolidone, or N-vinyl caprolactam, and the like, without being limited thereto. One or a mixture of two or more of the foregoing may be used.

In one example, as the polar functional group-containing unit, a hydroxy-containing monomer unit may be applied, and specifically, a hydroxyalkyl (meth)acrylate unit may be applied, where a hydroxyalkyl (meth)acrylate unit, in which the alkyl of the hydroxyalkyl moiety has 1 to 20, 1 to 16, 1 to 12, 1 to 8, 1 to 4, or 2 to 4 carbon atoms, may be employed. Here, the alkyl of the hydroxyalkyl moiety may be linear or branched.

The lower limit of the ratio of the polar functional group-containing unit relative to 100 parts by weight of the alkyl (meth)acrylate unit may be 10 parts by weight, 15 parts by weight, 20 parts by weight, 25 parts by weight, 30 parts by weight, 35 parts by weight, 40 parts by weight, 45 parts by weight, 50 parts by weight, 55 parts by weight, 60 parts by weight, 65 parts by weight, 70 parts by weight, 75 parts by weight, 80 parts by weight, 85 parts by weight, 90 parts by weight, 95 parts by weight, or 100 parts by weight or so, and the upper limit thereof may be 200 parts by weight, 195 parts by weight, 190 parts by weight, 185 parts by weight, 180 parts by weight, 175 parts by weight, 170 parts by weight, 165 parts by weight, 160 parts by weight, 155 parts by weight, 150 parts by weight, 145 parts by weight, 140 parts by weight, 135 parts by weight, 130 parts by weight, 125 parts by weight, 120 parts by weight, 115 parts by weight, 110 parts by weight, 105 parts by weight, 100 parts by weight, 95 parts by weight, 90 parts by weight, 85 parts by weight parts, 80 parts by weight, 75 parts by weight, 70 parts by weight, 65 parts by weight, 60 parts by weight, or 55 parts by weight or so. The ratio may be more than or equal to, or more than any one of the above-described lower limits, or may be less than or equal to, or less than any one of the above-described upper limits, or may be in a range of less than or equal to, or less than any one of the above-described upper limits while being more than or equal to, or more than any one of the above-described lower limits.

The unit of Formula 1 is a unit containing a long-chain alkyl group, and such a unit is included in the copolymer in a certain ratio or more, and in some cases, it interacts with a polar functional group as necessary, whereby it is possible to impart crystallinity or properties similar to crystallinity to the copolymer.

In the unit of Formula 1, $R_1$ may be hydrogen or an alkyl group with 1 to 4 carbon atoms, and may be specifically hydrogen, or a methyl or ethyl group.

In Formula 1, $R_2$ is an alkyl group with 11 to 13 carbon atoms, where such an alkyl group may be linear or branched, and may be substituted or unsubstituted. In one example, the $R_2$ may be an unsubstituted alkyl group while being linear. For example, the unit of Formula 1 may be formed using lauryl (meth)acrylate and/or tetradecyl (meth)acrylate, and the like.

The lower limit of the weight ratio of the unit of Formula 1 relative to 100 parts by weight of the alkyl (meth)acrylate unit may be 80 parts by weight, 85 parts by weight, 90 parts by weight, 95 parts by weight, 100 parts by weight, 105 parts by weight, 110 parts by weight, 115 parts by weight, 120 parts by weight, 125 parts by weight, 130 parts by weight, 135 parts by weight, 140 parts by weight, 145 parts by weight, 150 parts by weight, 155 parts by weight, 160 parts by weight, 175 parts by weight, 180 parts by weight, 185 parts by weight, 190 parts by weight, 195 parts by weight, 200 parts by weight, 205 parts by weight, 210 parts by weight, 215 parts by weight, 220 parts by weight, 225 parts by weight, 230 parts by weight, 235 parts by weight, 240 parts by weight, 245 parts by weight, 250 parts by weight, 255 parts by weight, 260 parts by weight, 275 parts by weight, 280 parts by weight, 285 parts by weight, 290 parts by weight, 295 parts by weight, or 300 parts by weight or so, and the upper limit thereof may also be 600 parts by weight, 595 parts by weight, 590 parts by weight, 585 parts by weight, 580 parts by weight, 575 parts by weight, 570 parts by weight, 565 parts by weight, 560 parts by weight, 555 parts by weight, 550 parts by weight, 545 parts by weight, 540 parts by weight, 535 parts by weight, 530 parts by weight, 525 parts by weight, 520 parts by weight, 515 parts by weight, 510 parts by weight, 505 parts by weight, 500 parts by weight, 495 parts by weight, 490 parts by weight, 485 parts by weight, 480 parts by weight, 475 parts by weight, 470 parts by weight, 465 parts by weight, 460 parts by weight, 455 parts by weight, 450 parts by weight, 445 parts by weight, 440 parts by weight, 435 parts by weight, 430 parts by weight, 425 parts by weight, 420 parts by weight, 415 parts by weight, 410 parts by weight, 405 parts by weight, 400 parts by weight, 395 parts by weight, 390 parts by weight, 385 parts by weight, 380 parts by weight, 375 parts by weight, 370 parts by weight, 365 parts by weight, 360 parts by weight, 355 parts by weight, 350 parts by weight, 345 parts by weight, 340 parts by weight, 335 parts by weight, 330 parts by weight, 325 parts by weight, 320 parts by weight, 315 parts by weight, 310 parts by weight, 305 parts by weight, 300 parts by weight, 295 parts by weight, 290 parts by weight, 285 parts by weight, 280 parts by weight, 275 parts by weight, 270 parts by weight, 265 parts by weight, 260 parts by weight, 255 parts by weight, 250 parts by weight, 245 parts by weight, 240 parts by weight, 235 parts by weight, 230 parts by weight, 225 parts by weight, 220 parts by weight, 215 parts by weight, 210 parts by weight, 205 parts by weight, 200 parts by weight, 195 parts by weight, 190 parts by weight, 185 parts by weight, 180 parts by weight, 175 parts by weight, 170 parts by weight, 165 parts by weight, 160 parts by weight, 155 parts by weight, 150 parts by weight, 145 parts by weight, 140 parts by weight, 135 parts by weight, 130 parts by weight, 125 parts by weight, 120 parts by weight, 115 parts by weight, 110 parts by weight, 105 parts by weight, or 100 parts by weight or so. The ratio may be more than or equal to, or more than any one of the above-described lower limits, or may be less than or equal to, or less than any one of the above-described upper limits, or may be in a range of less than or equal to, or less than any one of the above-described upper limits while being more than or equal to, or more than any one of the above-described lower limits.

The ratio of monomer units may be adjusted so that the acrylic copolymer exhibits the above-described glass transition temperature and melting point simultaneously.

That is, the acrylic copolymer containing the three types of monomer units as described above in a predetermined ratio has crystallinity or tends to exhibit properties similar to crystallinity, but in order to have the above-described melting point and glass transition temperature simultaneously, the composition of the acrylic copolymer may be further adjusted.

For example, in order for the acrylic copolymer to exhibit the above-described crystallinity, it is necessary to include at least 90 parts by weight or more of the unit of Formula 1 among the above-described units relative to 100 parts by weight of the alkyl (meth)acrylate unit. In another example, the ratio of the unit of Formula 1 above in the crystalline acrylic copolymer may be 95 parts by weight or more, 100 parts by weight or more, 105 parts by weight or more, 110 parts by weight or more, 115 parts by weight or more, 120 parts by weight or more, 125 parts by weight or more, 130 parts by weight or more, 135 parts by weight or more, 140 parts by weight or more, 145 parts by weight or more, 150 parts by weight or more, 155 parts by weight or more, 160 parts by weight or more, 175 parts by weight or more, 180 parts by weight or more, 185 parts by weight or more, 190 parts by weight or more, 195 parts by weight or more, 200 parts by weight or more, 205 parts by weight or more, 210 parts by weight or more, 215 parts by weight or more, 220 parts by weight or more, 225 parts by weight or more, 230 parts by weight or more, 235 parts by weight or more, 240 parts by weight or more, 245 parts by weight or more, 250 parts by weight or more, 255 parts by weight or more, 260 parts by weight or more, 275 parts by weight or more, 280 parts by weight or more, 285 parts by weight or more, 290 parts by weight or more, 295 parts by weight or more, or 300 parts by weight or more or so, or may also be 500 parts by weight or less, 495 parts by weight or less, 490 parts by weight or less, 485 parts by weight or less, 480 parts by weight or less, 475 parts by weight or less, 470 parts by weight or less, 465 parts by weight or less, 460 parts by weight or less, 455 parts by weight or less, 450 parts by weight or less, 445 parts by weight or less, 440 parts by weight or less, 435 parts by weight or less, 430 parts by weight or less, 425 parts by weight or less, 420 parts by weight or less, 415 parts by weight or less, 410 parts by weight or less, 405 parts by weight or less, 400 parts by weight or less, 395 parts by weight or less, 390 parts by weight or less, 385 parts by weight or less, 380 parts by weight or less, 375 parts by weight or less, 370 parts by weight or less, 365 parts by weight or less, 360 parts by weight or less, 355 parts by weight or less, 350 parts by weight or less, 345 parts by weight or less, 340 parts by weight or less, 335 parts by weight or less, 330 parts by weight or less, 325 parts by weight or less, 320 parts by weight or less, 315 parts by weight or less, 310 parts by weight or less, 305 parts by weight or less, 300 parts by weight or less, 295 parts by weight or less, 290 parts by weight or less, 285 parts by weight or less, 280 parts by weight or less, 275 parts by weight or less, 270 parts by weight or less, 265 parts by weight or less, 260 parts by weight or less, 255 parts by weight or less, 250 parts by weight or less, 245 parts by weight or less, 240 parts by weight or less, 235 parts by weight or less, 230 parts by weight or less, 225 parts by weight or less, 220 parts by weight or less, 215 parts by weight or less, 210 parts by weight or less, 205 parts by weight or less, 200 parts by weight or less, 195 parts by weight or less, 190 parts by weight or less, 185 parts by weight or less, 180 parts by weight or less, 175 parts by weight or less, 170 parts by weight or less, 165 parts by weight or less, 160 parts by weight or less, 155 parts by weight or less, 150 parts by weight or less, 145 parts by weight or less, 140 parts by weight or less, 135 parts by weight or less, 130 parts by weight or less, 125 parts by weight or less, 120 parts by weight or less, 115 parts by weight or less, 110 parts by weight or less, 105 parts by weight or less, or 100 parts by weight or less or so, relative to 100 parts by weight of the alkyl (meth)acrylate unit.

In the crystalline acrylic copolymer, the ratio (A/B) of the weight (A) of the unit of Formula 1 and the weight (B) of the polar functional group-containing unit may be controlled. For example, the lower limit of the ratio (A/B) may be 1, 1.2, 1.4, 1.5, 1.7, 1.9, 2.1, 2.3, 2.5, 2.7, or 2.9 or so, and the upper limit may be 10, 9, 8, 7, 6, 5, 4, 3, 2.5, or 2 or so. The ratio may be more than or equal to, or more than any one of the above-described lower limits, or may be less than or equal to, or less than any one of the above-described upper limits, or may be in a range of less than or equal to, or less than any one of the above-described upper limits while being more than or equal to, or more than any one of the above-described lower limits. Also, in the crystalline acrylic copolymer, the polar functional group-containing unit may be a hydroxy group-containing unit. In one example, a hydroxyalkyl (meth)acrylate having a hydroxyalkyl group with 3 to 6 carbon atoms, 3 to 5 carbon atoms, 3 to 4 carbon atoms, or about 4 carbon atoms may suitably form the crystalline acrylic copolymer. Although the reason is not clear, it is thought that the interaction between the alkyl group ($R_2$) of the unit of Formula 1 and the hydroxyalkyl group contributes to the expression of crystallinity of the acrylic copolymer.

The crystalline acrylic copolymer may comprise the alkyl (meth)acrylate unit in a ratio within the range of about 15 to 55 wt %. In another example, the ratio of the alkyl (meth)acrylate unit may be 20 wt % or more, 25 wt % or more, 30 wt % or more, 35 wt % or more, or 40 wt % or more or so, or may also be 50 wt % or less, 45 wt % or less, 40 wt % or less, 35 wt % or less, 30 wt % or less, 25 wt % or less, or 20 wt % or less or so. Within this range, it is possible to effectively form a desired pressure-sensitive adhesive.

It is thought that the crystallinity is provided to the acrylic copolymer and the melting point is identified by the interaction or regularity of the respective monomer units contained in the ratio.

The acrylic copolymer may appropriately contain other monomer units in addition to the above-described monomer units, as long as the purpose is not impaired (for example, the crystallinity of the copolymer is not impaired).

For example, the acrylic copolymer (pressure-sensitive adhesive polymer) may further comprise a monomer unit of Formula 2 below. The monomer unit of Formula 2 below is an optional monomer unit, which may not be included in the acrylic copolymer.

[Formula 2]

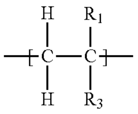

In Formula 2, $R_1$ represents hydrogen or an alkyl group, and $R_3$ is an aromatic ketone group or a (meth)acryloyl group.

The unit of Formula 2 above is a unit containing an aromatic ketone group or a (meth)acryloyl group in its side chain.

The aromatic ketone group or (meth)acryloyl group in the pressure-sensitive adhesive may exist as such, or may also exist in a state after undergoing a hydrogen removal reaction or radical reaction described below.

The aromatic ketone group in the unit of Formula 2 means an aromatic ketone group that induces hydrogen removal (hydrogen abstraction) from a polymer chain when exposed to electromagnetic waves, or a substituent containing such an aromatic ketone group.

When exposed to electromagnetic waves, the aromatic ketone group can remove hydrogen atoms from other polymer chains or from other parts of the polymer chain. This removal results in the formation of radicals, where the radicals can form cross-links between polymer chains or within the same polymer chain. In the category of such aromatic ketone groups, for example, aromatic ketone groups such as derivatives of benzophenone, acetophenone, or anthraquinone are included.

The monomer capable of deriving the unit of Formula 2 having an aromatic ketone group includes 4-benzoylphenyl (meth)acrylate, 4-(meth)acryloyloxyethoxybenzophenone, 4-(meth)acryloyloxy-4'-methoxybenzophenone, 4-(meth)acryloyloxyethoxy-4'-methoxybenzophenone, 4-(meth)acryloyloxy-4'-bromobenzophenone and/or 4-acryloyloxyethoxy-4'-bromobenzophenone, and the like, but is not limited thereto.

The (meth)acryloyl group in the unit of Formula 2 means a (meth)acryloyl group that induces free radical polymerization when exposed to electromagnetic waves in the presence of an appropriate radical initiator, or a substituent comprising the same. Such a (meth)acryloyl group may act similarly to the aromatic ketone group by irradiation with electromagnetic waves.

The unit of Formula 2 in which $R_3$ is a (meth)acryloyl group, for example, may be formed by preparing a precursor copolymer and then further reacting it with an unsaturated reagent compound to introduce a (meth)acryloyl group. Typically, the introduction of the (meth)acryloyl group involves (1) a reaction between a nucleophilic group on the precursor copolymer and an electrophilic group on the unsaturated reagent compound (i.e., the unsaturated reagent compound contains both an electrophilic group and a (meth) acryloyl group), or (2) a reaction between an electrophilic group on the precursor copolymer and a nucleophilic group on the unsaturated reagent compound (i.e., the unsaturated reagent compound contains both nucleophilic groups and (meth)acryloyl groups). These reactions between nucleophilic groups and electrophilic groups are typically ring opening reactions, addition reactions or condensation reactions.

In this case, the precursor copolymer has a hydroxy, carboxylic acid (—COOH), or anhydride (—O—(CO)—O—) group. When the precursor copolymer has a hydroxyl group, the unsaturated reagent compound often has a carboxylic acid (—COOH), isocyanato (—NCO), epoxy (i.e., oxiranyl) or anhydride group in addition to the (meth) acryloyl group. When the precursor copolymer has a carboxylic acid group, the unsaturated reagent compound often has a hydroxy, amino, epoxy, isocyanato, aziridinyl, azetidinyl or oxazolinyl group in addition to the (meth)acryloyl group. When the precursor (meth)acrylate copolymer has an anhydride group, the unsaturated reagent compound often has a hydroxy or amine group in addition to the (meth) acryloyl group.

In one example, the precursor copolymer may have a carboxylic acid group and the unsaturated reagent compound may have an epoxy group. In an exemplary unsaturated reagent compound, for example, glycidyl (meth)acrylate and 4-hydroxybutyl acrylate glycidyl ether are included. In another example, the precursor copolymer has an anhydride group, and reacts with an unsaturated reagent compound which is a hydroxy-substituted alkyl (meth)acrylate, such as 2-hydroxyethyl (meth)acrylate, 3-hydroxypropyl (meth)acrylate, and the like. In another example, the precursor copolymer has a hydroxy group and the unsaturated reagent compound has an isocyanato group and a (meth) acryloyl group. Such an unsaturated reagent compound comprises an isocyanatoalkyl (meth)acrylate, such as isocyanatoethyl (meth)acrylate, but is not limited thereto.

In one example, the (meth)acryloyl group may be represented by the formula $CH_2{=}CHR^1$—(CO)-Q-L- (wherein, L is a linking group and Q is oxy (—O—) or —NH—). Here, L comprises alkylene, arylene, or a combination thereof, and further comprises —O—, —O—(CO)—, —NH—(CO)—, —NH—, or a combination thereof, optionally depending on the precursor copolymer and the specific unsaturated reagent compound, which are reacted to form the (meth)acryloyl group. In some specific examples, the (meth)acryloyl group is $H_2C{=}CHR^1$—(CO)—O—$R^6$—NH—(CO)—O—$R^5$—O—(CO)—, which is formed by a reaction of a hydroxy-containing group of the precursor copolymer represented by the formula —(CO)—O—$R^5$—OH and the unsaturated reagent compound which is an isocyanatoalkyl (meth)acrylate represented by the formula $H_2C{=}CHR^1$—(CO)—O—$R^6$—NCO. Here, $R^5$ and $R^6$ are each independently an alkylene group, for example, alkylene having 1 to 10 carbon atoms, 1 to 6 carbon atoms, or 1 to 4 carbon atoms. In addition, here, $R^1$ is methyl or hydrogen.

In the unit of Formula 2, $R_1$ may be hydrogen or an alkyl group with 1 to 4 carbon atoms, and specifically, may be hydrogen, or a methyl or ethyl group.

The unit of Formula 2, when included, may be included in the acrylic copolymer in a ratio of about 0.001 to 5 parts by weight relative to 100 parts by weight of the alkyl (meth)acrylate unit, and under this ratio, it is possible to effectively form the desired pressure-sensitive adhesive layer by irradiation of electromagnetic waves.

In another example, the acrylic copolymer may not contain the unit of Formula 2 above or may contain it in a relatively small amount, which is particularly advantageous when forming the pressure-sensitive adhesive into a relatively thick film. That is, in order to form a thick pressure-sensitive adhesive, application of the existing solvent-type pressure-sensitive adhesive composition is not appropriate, and a so-called solventless or syrup-type pressure-sensitive adhesive composition may be applied. Such a pressure-sensitive adhesive composition is usually a so-called radical reactive type. In the case where the acrylic copolymer contains the units of Formula 2 in a certain amount or more, when radicals are generated for curing the non-solvent type or syrup type pressure-sensitive adhesive composition, the overall cross-linked structure of the pressure-sensitive adhesive is changed by radicals derived from the units of Formula 2, whereby it may be difficult to secure desired physical properties (e.g., low-temperature storage elastic modulus, etc.).

Therefore, in one example, the upper limit of the ratio of the unit of Formula 2 above based on the total weight of the acrylic copolymer may be 0.1 wt %, 0.09 wt %, 0.08 wt %, 0.07 wt %, 0.06 wt %, 0.05 wt %, 0.04 wt %, 0.03 wt %, 0.02 wt %, 0.01 wt %, 0.009 wt %, 0.008 wt %, 0.007 wt %, 0.006 wt %, 0.005 wt %, 0.004 wt %, 0.003 wt %, 0.002 wt %, or 0.001 wt % or so, and the lower limit thereof may be 0 wt % or so. The ratio may be less than or equal to, or less than any one of the above-described upper limits, or may be in a range of less than or equal to, or less than any one of the above-described upper limits while being more than or equal to, or more than any one of the above-described lower limits.

In another example, the upper limit of the ratio of the unit of Formula 2 above may be 0.2 parts by weight, 0.15 parts by weight, 0.1 parts by weight, 0.05 parts by weight, 0.01 parts by weight, 0.005 parts by weight, 0.004 parts by weight, 0.003 parts by weight, 0.002 parts by weight, 0.001 parts by weight, 0.00095 parts by weight, or 0.0009 parts by weight or so, and the lower limit thereof may be 0 parts by weight or so. The ratio may be less than or equal to, or less than any one of the above-described upper limits, or may be in a range of less than or equal to, or less than any one of the above-described upper limits while being more than or equal to, or more than any one of the above-described lower limits.

Meanwhile, the above solventless or syrup-type pressure-sensitive adhesive composition means a pressure-sensitive adhesive composition which comprises a mixture of a high molecular weight component and a low molecular weight component (e.g., a mixture of a prepolymer or a polymer (including a prepolymer) and a monomer for dilution) as a main component, and does not comprise a solvent substantially or comprises the solvent in a limited content.

For example, in the solventless or syrup-type pressure-sensitive adhesive composition, the upper limit of the content of the solvent (normal organic solvent or aqueous solvent, etc.) based on the total weight of the pressure-sensitive adhesive composition may be 30 wt %, 25 wt %, 20 wt % %, 15 wt %, 10 wt %, 5 wt %, 1 wt %, or 0.5 wt % or so, and the lower limit thereof may be 0 wt % or so. In the solventless or syrup-type pressure-sensitive adhesive composition, the content of the solvent may be less than or equal to, or less than any one of the above-described upper limits, or may be in a range of less than or equal to, or less than any one of the above-described upper limits while being more than or equal to, or more than any one of the above-described lower limits.

As the acrylic copolymer, a copolymer having a weight average molecular weight of 1,000,000 or more may be used. In this specification, the weight average molecular weight means a polystyrene conversion value measured by GPC (gel permeation chromatography).

The lower limit of the weight average molecular weight of the copolymer may be 1,100,000, 1,200,000, 1,300,000, 1,400,000, or 1,500,000 or so, and the upper limit thereof may be 5,000,000, 4,000,000, 3,000,000, 2,500,000, 2,000, 000, or 1,900,000, 1,800,000, 1,700,000, 1,600,000, or 1,550,000 or so. The weight average molecular weight may be less than or equal to, or less than any one of the above-described upper limits, or may be more than or equal to, or more than any one of the above-described lower limits, or may be in a range of less than or equal to, or less than the above-described upper limit while being more than or equal to, or more than any one of the above-described lower limits.

The pressure-sensitive adhesive may further comprise a cross-linking agent.

The type of the cross-linking agent is not particularly limited, and for example, a general cross-linking agent such as an isocyanate-based compound, an epoxy-based compound, an aziridine-based compound, and a metal chelate-based compound may be used. This type of cross-linking agent is a so-called thermal cross-linking agent that implements a cross-linked structure by application of heat, and is different from a radical cross-linking agent to be described below. A specific example of the isocyanate-based compound may include one or more selected from the group consisting of tolylene diisocyanate, xylene diisocyanate, diphenylmethane diisocyanate, hexamethylene diisocyanate, isoborone diisocyanate, tetramethylxylene diisocyanate, naphthalene diisocyanate, and a reactant of any one of the foregoing with a polyol (e.g., trimethylol propane); a specific example of the epoxy compound may include one or more selected from the group consisting of ethylene glycol diglycidyl ether, triglycidyl ether, trimethylolpropane triglycidyl ether, N,N,N',N'-tetraglycidyl ethylenediamine and glycerin diglycidyl ether; and a specific example of the aziridine-based compound may include one or more selected from the group consisting of N,N'-toluene-2,4-bis(1-aziridinecarboxamide), N,N'-diphenylmethane-4,4'-bis(1-aziridinecarboxamide), triethylene melamine, bisisoprotaloyl-1-(2-methylaziridine), and tri-1-aziridinylphosphine oxide, without being limited thereto. In addition, here, a specific example of the metal chelate-based compound may include a compound in which a polyvalent metal such as aluminum, iron, zinc, tin, titanium, antimony, magnesium and/or vanadium is coordinated with acetyl acetone or ethyl acetoacetate, and the like, but is not limited thereto.

In the pressure-sensitive adhesive, the cross-linking agent may be included in an amount of 0.01 parts by weight to 10 parts by weight or 0.01 parts by weight to 5 parts by weight relative to 100 parts by weight of the acrylic copolymer. In the above range, it may be adjusted in consideration of the cohesive force and durability of the pressure-sensitive adhesive, and the like. In one example, the ratio of the cross-linking agent may be about 0.02 parts by weight or more, about 0.03 parts by weight or more, about 0.04 parts by weight or more, about 0.05 parts by weight or more, 0.06 parts by weight or more, or about 0.07 parts by weight or more, or may also be about 4 parts by weight or less, about 3 parts by weight or less, about 2 parts by weight or less, about 1 part by weight or less, about 0.8 parts by weight or less, about 0.6 parts by weight or less, about 0.4 parts by weight or less, about 0.2 parts by weight or less, about 0.15 parts by weight or less, about 0.1 parts by weight or less, or about 0.09 parts by weight or less or so.

When the content of the cross-linking agent is selected to cross-link the acrylic copolymer at an appropriate level within the content range, it is possible to effectively form the desired pressure-sensitive adhesive.

The pressure-sensitive adhesive may comprise, as the cross-linking agent, a so-called radical cross-linking agent which is a cross-linking agent of a different type from the thermal cross-linking agent. Such a cross-linking agent is usefully used, particularly, in the solventless or syrup-type pressure-sensitive adhesive composition. Such a cross-linking agent implements a cross-linking structure by a radical reaction. It may be more advantageous to apply a radical cross-linking agent as above for efficient achievement of desired properties. Such a radical cross-linking agent may be exemplified by a so-called polyfunctional acrylate, which may include, for example, bifunctional acrylates such as 1,4-butanediol di(meth)acrylate, 1,6-hexanediol di(meth) acrylate, neopentylglycol di(meth)acrylate, polyethylene glycol di(meth)acrylate, neopentyl glycol adipate di(meth) acrylate, hydroxypivalic acid neopentyl glycol di(meth) acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecanedimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate or 9,9-bis[4-(2-acryloyloxyethoxy)phenyl]fluorene; trifunctional acrylates such as trimethylolpropane tri(meth) acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, trifunctional urethane (meth)acrylate, or tris(meth)acryloxyethyl isocyanurate; tetrafunctional acrylates such as diglycerin tetra(meth)acrylate or pentaerythritol tetra(meth)acrylate; pentafunctional acrylates such as propionic acid-modified dipentaerythritol penta(meth)acrylate; and hexafunctional acrylates such as dipentaerythritol hexa(meth)acrylate, caprolactone-modified dipentaerythritol hexa(meth)acrylate or urethane (meth) acrylate (e.g., a reactant of an isocyanate monomer and trimethylol propane tri(meth)acrylate, etc.), and the like, but is not limited thereto.

In the pressure-sensitive adhesive layer, the radical cross-linking agent may also be present in an appropriate ratio depending on the purpose, and for example, the lower limit of the weight ratio of the radical cross-linking agent relative to 100 parts by weight of the acrylic copolymer may be 0.001 parts by weight, 0.005 parts by weight, 0.01 parts by weight, 0.02 parts by weight, 0.03 parts by weight, 0.04 parts by weight, or 0.05 parts by weight, and the upper limit thereof may be 10 parts by weight, 9.5 parts by weight, 9 parts by weight, 8.5 parts by weight, 8 parts by weight, 7.5 parts by weight, 7 parts by weight. 6.5 parts by weight, 6 parts by weight, 5.5 parts by weight, 5 parts by weight, 4.5 parts by weight, 4 parts by weight, 3.5 parts by weight, 3 parts by weight, 2.5 parts by weight, 2 parts by weight, 1.5 parts by weight, 1 part by weight, 0.9 parts by weight, 0.8 parts by weight, 0.7 parts by weight, 0.6 parts by weight, 0.5 parts by weight, 0.4 parts by weight, 0.3 parts by weight, 0.2 parts by weight, 0.1 parts by weight, 0.09 parts by weight, 0.08 parts by weight, 0.07 parts by weight, 0.06 parts by weight, or 0.05 parts by weight or so. The ratio may be less than or equal to, or less than any one of the above-described upper limits, or may be more than or equal to, or more than any one of the above-described lower limits, or may be in a range of less than or equal to, or less than the above-described upper limit while being more than or equal to, or more than any one of the above-described lower limits.

In addition to the above components, the pressure-sensitive adhesive may comprise appropriate additional components as needed, which may also comprise, for example, components of a radical initiator, an ultraviolet absorber, a light stabilizer, a plasticizer, and/or a cross-linking catalyst, and the like.

The pressure-sensitive adhesive of the present application may be formed by cross-linking the pressure-sensitive adhesive composition comprising such components. A method of forming the pressure-sensitive adhesive layer by cross-linking is not particularly limited, where the pressure-sensitive adhesive may be formed by applying an appropriate cross-linking method in consideration of the type of the applied pressure-sensitive adhesive polymer and/or cross-linking agent. For example, if the polymer and/or cross-linking agent is a type cross-linked by application of heat, a cross-linked product may be formed by applying appropriate heat, and if it is a type cross-linked by irradiation of electromagnetic waves, a cross-linked product may be formed by irradiating it with appropriate electromagnetic waves, and other cross-linking methods may also be applied.

For example, the pressure-sensitive adhesive may be a cured product or a cross-linked product of the above-described solventless or syrup type pressure-sensitive adhesive composition.

Such a pressure-sensitive adhesive may exhibit the above-described elastic modulus characteristics.

The pressure-sensitive adhesive of the present application may be in the form of a layer. In this case, the thickness of the pressure-sensitive adhesive layer is not particularly limited, where it may have a thickness of a typical pressure-sensitive adhesive layer in consideration of the applied use.

The pressure-sensitive adhesive of the present application may satisfy the above-mentioned necessary physical properties even when it is formed, particularly, into a thick film.

For example, the lower limit of the thickness of the pressure-sensitive adhesive may be 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, or 100 μm or so, and the upper limit thereof may be 1000 μm, 900 μm, 800 μm, 700 μm, 600 μm, 500 μm, 400 μm, 300 μm, 200 μm, 150 μm, or 100 μm or so. The thickness may be less than or equal to, or less than any one of the above-described upper limits, or may be more than or equal to, or more than any one of the above-described lower limits, or may be in a range of less than or equal to, or less than the above-described upper limit while being more than or equal to, or more than any one of the above-described lower limits.

The present application also relates to a pressure-sensitive adhesive film or an optical laminate, comprising a base film and the pressure-sensitive adhesive formed on one side or both sides of the base film. In the case of the optical laminate, the base film may be an optical film. The pressure-sensitive adhesive may be included in the form of a layer.

The pressure-sensitive adhesive of the present application may be formed on one side or both sides of the base film to form a pressure-sensitive adhesive film, or formed on one side or both sides of the base film, which is an optical film, to form an optical laminate.

The type of the base film is not particularly limited. As the base film, a base film which is applicable to the formation of the pressure-sensitive adhesive film may be usually applied.

For example, as the base film, a PET (poly(ethylene terephthalate)) film, a PTFE (poly(tetrafluoroethylene)) film, a PP (polypropylene) film, a PE (polyethylene) film, a polyimide film, a polyamide film, a COP (cyclic olefin polymer) film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film and/or a polyimide film, and the like may be used, without being limited thereto.

The thickness of the base film is not particularly limited, and it may have an appropriate thickness within a range suitable for the purpose.

When the optical film is applied as the base film, there is no particular limitation on the type of the optical film. In one example, the optical film may be a polarizing film, a polarizing plate, or a retardation film, and the like. Even in this case, the optical film may have a thickness in an appropriate range depending on the purpose.

The pressure-sensitive adhesive film or the optical laminate may further comprise a release film or a protective film for protecting the pressure-sensitive adhesive layer until use, if necessary.

The present application also relates to a flexible device comprising the pressure-sensitive adhesive, the pressure-sensitive adhesive film, or the optical laminate. Here, the pressure-sensitive adhesive may be included in the form of a layer. In the device, there is no particular limitation on the application form of the pressure-sensitive adhesive, the pressure-sensitive adhesive film, or the optical laminate. For example, the pressure-sensitive adhesive may be used for the application of a so-called OCA (Optically Clear Adhesive) or OCR (Optically Clear Resin) in the device, and thus the application form of the pressure-sensitive adhesive, the pressure-sensitive adhesive film, or the optical laminate may be the same as the application form of the conventional OCA or OCR.

In this case, in one example, the flexible device may comprise a display panel and the pressure-sensitive adhesive, pressure-sensitive adhesive film, or optical laminate present on one or both sides of the display panel. In this case, the display panel may be configured to be folded or rolled through one or more folding shafts or rolling shafts.

Other elements constituting such a flexible device are not particularly limited, where well-known components of the flexible device may be employed without limitation.

Advantageous Effects

The present application may provide a pressure-sensitive adhesive with excellent reliability, which is applied to a flexible device, thereby effectively responding to repeated deformation and recovery, causing no defects (for example, observation of deformation traces and the like) before and after deformation, having excellent cuttability, workability, and recoverability, and causing no lifting, delamination, and/or bubble generation. The present application may also provide a pressure-sensitive adhesive film or an optical film, and a flexible device such as a foldable device or a rollable device, comprising the pressure-sensitive adhesive.

BRIEF DESCRIPTION OF DRAWINGS

FIG. 1 is a diagram showing a process in which a folding test is performed.

Hereinafter, the present application will be described in detail through Examples, but the scope of the present application is not limited by Examples below.

1. Storage Elastic Modulus Measurement Method (Temperature Sweep)

The storage elastic modulus was evaluated using ARES G2 (Advanced Rheometric Expansion System G2) (TA). A specimen was prepared by cutting a pressure-sensitive adhesive layer having a thickness of about 0.8 mm or so into a circle having a diameter of about 8 mm or so. The pressure-sensitive adhesive layer was prepared by overlapping pressure-sensitive adhesive layers having a thickness of about 25 μm or so to have a thickness of about 0.8 mm or so. The storage elastic modulus at the measurement temperature was evaluated for the specimen using a parallel plate fixture having a diameter of about 8 mm. Upon the evaluation, the evaluation conditions were set to a frequency of 1 Hz and a strain of 0.5%. The storage elastic modulus for each temperature was confirmed while the measurement temperature was raised from −60° C. to 90° C. at a temperature rise rate of about 10° C./min.

2. Storage Elastic Modulus Measurement Method (Frequency Sweep)

The storage elastic modulus was evaluated using ARES G2 (Advanced Rheometric Expansion System G2) (TA). A specimen was prepared by cutting a pressure-sensitive adhesive layer having a thickness of about 0.8 mm or so into a circle having a diameter of about 8 mm or so. The pressure-sensitive adhesive layer was prepared by overlapping pressure-sensitive adhesive layers having a thickness of about 25 μm or so to have a thickness of about 0.8 mm or so. The storage elastic modulus was evaluated for the specimen using a parallel plate fixture having a diameter of about 8 mm. Upon the evaluation, the evaluation conditions were set to a frequency range of 0.1 rad/sec to 100 rad/sec and a strain of 5.0%. The measurement temperature is 30° C.

3. Evaluation of Melting Point and Glass Transition Temperature

A melting point and a glass transition temperature were measured according to a measurement method using a conventional DSC (Differential Scanning Calorimeter) equipment. As the equipment, DSC2500 equipment (TA) was used. About 10 mg of the sample (copolymer) was sealed in a dedicated pan, and the melting point and the glass transition temperature were measured by setting the warming condition to 10° C./min and the cooling condition to −10° C./min, and identifying endothermic and exothermic heat quantities depending on the temperature in an $N_2$ atmosphere.

The measurement temperature range was −120° C. to 200° C. Regarding the conditions, first, it was cooled from room temperature (about 30° C.) to −120° C. at a rate of about −10° C./min, and heated again to 200° C. at a temperature increase rate of 10° C./min (primary heating). Thereafter, it was cooled to −120° C. at a rate of about −10° C./min again, and heated again to 200° C. at a temperature increase rate of 10° C./min (secondary heating).

The melting point and the glass transition temperature were evaluated upon the second heating.

4. Evaluation of Weight Average Molecular Weight

The weight average molecular weight (Mw) of the copolymer was measured using GPC (Gel Permeation Chromatograph), and the measurement conditions are as follows. When measuring the weight average molecular weight, the measurement results were converted using standard polystyrene (manufactured by Aglient System) to prepare the calibration curve.

<GPC Measurement Conditions>

Measuring instrument: Aglient GPC (Aglient 1200 series, U.S.)
Column: connecting two PL Mixed B
Column temperature: 40° C.
Eluent: THE (tetrahydrofuran)
Flow rate: 1.0 μL/min
Concentration: −1 mg/mL (100 μl injection)

5. Folding Test

A folding test was performed on a specimen in which a laminate manufactured by laminating a PI film (polyimide film, thickness of about 50 μm) subjected to hard coating on both sides, a pressure-sensitive adhesive layer prepared in Examples, and the like, and an ITO (indium tin oxide) film with a thickness of about 50 μm or so sequentially (ITO layer/PET film laminate structure) was cut into a rectangular shape with a width of 2.54 cm or so and a length of 20 cm or so.

As shown in FIG. 1, the folding that the specimen was sandwiched between parallel plates at an interval of 5 mm, and folded was repeated at −20° C., and the sample was collected and then, defects, such as the occurrence of air bubbles, the occurrence of lifting/peeling, and the occurrence of hard coating layer cracks, in the sample were visually observed.

The evaluation criteria are as follows.

<Evaluation Criteria>

O: No occurrence of air bubbles, occurrence of lifting/peeling, and occurrence of hard coating layer cracks up to 100,000 times of folding Δ: No occurrence of air bubbles, occurrence of lifting/peeling, and occurrence of hard coating layer cracks up to 50,000 times of folding x: One or more of occurrence of air bubbles, occurrence of lifting/peeling, and occurrence of hard coating layer cracks at 50,000 times of folding 6. Reliability Evaluation The reliability evaluation was performed on a sample in which a soda lime glass (H Glass, 80 mm×140 mm) with a thickness of about 1.1 mm and a soda lime glass (H Glass, 80 mm×140 mm) with a thickness of about 0.55 mm were laminated on both sides of the pressure-sensitive adhesive layer.

The pressure-sensitive adhesive to be evaluated was cut to a size of about 70 mm×130 mm and applied. The sample was put into a reliability chamber at −40° C., maintained for 500 hours, and the occurrence of bubbles and the change of optical properties were observed in the collected sample.

The evaluation criteria are as follows.

<Evaluation Criteria>

O: No bubbles are generated, the haze change is 0.5% or less, and the change in b* value of the CIE color coordinate is 1 or less x: One or more of bubble occurrence, haze change rate of more than 0.5%, and change of more than 1 in b* value of the CIE color coordinate

Preparation Example 1. Preparation of Copolymer (A)

2-ethylhexyl acrylate (2-EHA), lauryl acrylate (LA) and 4-hydroxybutyl acrylate (HBA) were introduced into a 50 mL vial in a weight ratio of 4:4:2 (2-EHA: LA: HBA) (total amount: about 40 g), and nitrogen ($N_2$) was purged.

An optical radical initiator (Irgacure 184) was further introduced thereto at a concentration of about 500 ppm, and irradiated with light from a metal halide lamp at a light quantity of about 0.8 J/$cm^2$ or so based on UV A for 20 seconds to prepare a copolymer (A). The copolymer (A) is in the form of a partially polymerized prepolymer, and has a weight average molecular weight of about 1,500,000 or so.

Preparation Examples 2 to 9. Preparation of Copolymers

Copolymers in the form of partially polymerized prepolymers were prepared in the same manner as in Preparation Example 1, except that the weight ratios of the applied monomers were changed as shown in Table 1 below. In Table 1 below, the numerical value for each monomer means a weight ratio.

TABLE 1

| | Copolymer | 2-EHA | LA | HBA | Mw (ten thousand) |
|---|---|---|---|---|---|
| Preparation Example 1 | A | 4 | 4 | 2 | 150 |
| Preparation Example 2 | B | 3 | 5 | 2 | 150 |
| Preparation Example 3 | C | 2 | 6 | 2 | 150 |
| Preparation Example 4 | D | 8 | 0 | 2 | 150 |
| Preparation Example 5 | E | 7 | 1 | 2 | 150 |
| Preparation Example 6 | F | 6 | 2 | 2 | 150 |
| Preparation Example 7 | G | 5 | 3 | 2 | 150 |
| Preparation Example 8 | H | 1 | 7 | 2 | 150 |
| Preparation Example 9 | I | 0 | 8 | 2 | 150 |

2-EHA: 2-ethylhexyl acrylate
LA: lauryl acrylate
HBA: 4-hydroxybutyl acrylate
Mw: weight average molecular weight The melting point and glass transition temperature measured for each copolymer of Preparation Examples above are shown in Table 2 below. In Table 2 below, if the glass transition temperature or melting point was not observed, the relevant numerical value was not described.

TABLE 2

| | Copolymer | Tg | Tm |
|---|---|---|---|
| Preparation Example 1 | A | −63 | −44 |
| Preparation Example 2 | B | −62 | −31 |
| Preparation Example 3 | C | −61 | −21 |
| Preparation Example 4 | D | −59 | — |
| Preparation Example 5 | E | −59 | — |
| Preparation Example 6 | F | −61 | — |
| Preparation Example 7 | G | −61 | — |
| Preparation Example 8 | H | — | −14 |
| Preparation Example 9 | I | — | −7 |

Tg: glass transition temperature (unit: ° C.)
Tm: melting point (unit: ° C.)

Example 1

A pressure-sensitive adhesive composition was prepared by introducing about 0.05 parts by weight of 1,6-hexanediol diacrylate relative to 100 parts by weight of the copolymer (prepolymer) (A) of Preparation Example 1 thereto as a curing agent, introducing about 3 parts by weight of an optical radical initiator (Irgacure 651) relative to 100 parts by weight of the copolymer (prepolymer) (A) thereto, and mixing them. The pressure-sensitive adhesive composition was applied on the release surface of a release PET film, and irradiated with a black light using a UV exposure curing machine for about 3 minutes to form a pressure-sensitive adhesive layer having a thickness of about 100 μm or so (light quantity: 0.8 J/$cm^2$ based on UV A).

Example 2

A pressure-sensitive adhesive layer was formed in the same manner as in Example 1, except that the copolymer (prepolymer) (B) of Preparation Example 2 was applied.

Example 3

A pressure-sensitive adhesive layer was formed in the same manner as in Example 1, except that the copolymer (prepolymer) (C) of Preparation Example 3 was applied.

Comparative Example 1

A pressure-sensitive adhesive layer was formed in the same manner as in Example 1, except that the copolymer (prepolymer) (D) of Preparation Example 4 was applied.

Comparative Example 2

A pressure-sensitive adhesive layer was formed in the same manner as in Example 1, except that the copolymer (prepolymer) (E) of Preparation Example 5 was applied.

Comparative Example 3

A pressure-sensitive adhesive layer was formed in the same manner as in Example 1, except that the copolymer (prepolymer) (F) of Preparation Example 6 was applied.

Comparative Example 4

A pressure-sensitive adhesive layer was formed in the same manner as in Example 1, except that the copolymer (prepolymer) (G) of Preparation Example 7 was applied.

Comparative Example 5

A pressure-sensitive adhesive layer was formed in the same manner as in Example 1, except that the copolymer (prepolymer) (H) of Preparation Example 8 was applied.

Comparative Example 6

A pressure-sensitive adhesive layer was formed in the same manner as in Example 1, except that the copolymer (prepolymer) (I) of Preparation Example 9 was applied.

The storage elastic moduli, folding test results, and reliability test results evaluated for the pressure-sensitive adhesive layers of Examples and Comparative Examples are summarized in Table 3 below.

TABLE 3

| | Storage elastic modulus (unit: Pa) | | | | | |
|---|---|---|---|---|---|---|
| | Temperature sweep | | | Frequency sweep | Folding | Reliability |
| | −20° C. | 25° C. | 60° C. | 30° C. | test | test |
| Example 1 | 91825 | 30414 | 22525 | 19599 | ○ | ○ |
| Example 2 | 92208 | 28362 | 20198 | 18771 | ○ | ○ |
| Example 3 | 84937 | 22647 | 15203 | 14291 | ○ | ○ |
| Comparative Example 1 | 131617 | 42984 | 31668 | 30299 | x | ○ |
| Comparative Example 2 | 129775 | 41957 | 30775 | 27520 | x | ○ |
| Comparative Example 3 | 109845 | 36927 | 27112 | 24320 | Δ | ○ |
| Comparative Example 4 | 99339 | 33123 | 24157 | 21560 | Δ | ○ |
| Comparative Example 5 | 1335630 | 20679 | 13959 | 13091 | x | x |
| Comparative Example 6 | 21978300 | 21655 | 14236 | 13759 | x | x |

The invention claimed is:

1. A pressure-sensitive adhesive comprising a pressure-sensitive adhesive polymer, wherein the pressure-sensitive adhesive polymer is an acrylic copolymer exhibiting a glass transition temperature and a melting temperature simultaneously, and an absolute value of the change rate ΔG1' of the storage elastic modulus of 1,700 or less according to Equation 1 below:

$$\Delta G1' = (G'_{25} - G'_{-20})/45 \quad \text{[Equation 1]}$$

wherein, $G'_{25}$ is the storage elastic modulus of the pressure-sensitive adhesive at 25° C., and $G'_{-20}$ is the storage elastic modulus of the pressure-sensitive adhesive at −20° C.;

wherein the storage elastic modulus at −20° C. is 70,000 to 100,000 Pa;

wherein the storage elastic modulus at 25° C. is at least 10,000 Pa;

wherein the storage elastic modulus at 60° C. is at least 10,000 Pa;

wherein an absolute value of the change rate ΔG2' of the storage elastic modulus according to Equation 2 below is 1,100 or less:

$$\Delta G2' = (G'_{60} - G'_{-20})/80 \quad \text{[Equation 2]}$$

wherein, $G'_{60}$ is the storage elastic modulus of the pressure-sensitive adhesive at 60° C., and $G'_{-20}$ is the storage elastic modulus of the pressure-sensitive adhesive at −20° C.;

wherein an absolute value of the change rate ΔG3' of the storage elastic modulus according to Equation 3 below is 600 or less:

$$\Delta G3' = (G'_{60} - G'_{25})/35 \quad \text{[Equation 3]}$$

wherein, ΔG3' is the storage elastic modulus of the pressure-sensitive adhesive at 60° C., and G'25 is the storage elastic modulus of the pressure-sensitive adhesive at 25° C.;

wherein the TM of Equation 4 below is at least 400 um·$MPa^{-1}$:

$$TM = D/G'_{-20} \quad \text{[Equation 4]}$$

wherein, D is the thickness of the pressure-sensitive adhesive, and $G'^{-20}$ is the storage elastic modulus of the pressure-sensitive adhesive at −20° C.

2. The pressure-sensitive adhesive according to claim 1, wherein the acrylic copolymer has a glass transition temperature of −30° C. or less and a melting temperature of −10° C. or less.

3. The pressure-sensitive adhesive according to claim 1, wherein the acrylic copolymer has a difference (Tm−Tg) between the melting temperature and the glass transition temperature of at least 15° C.

4. The pressure-sensitive adhesive according to claim 1, wherein the acrylic copolymer comprises an alkyl (meth)

acrylate unit, a unit of Formula 1 below, and a polar functional group-containing unit:

[Formula 1]

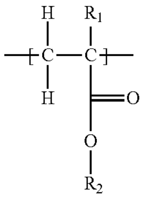

wherein, $R_1$ represents hydrogen or an alkyl group, and $R_2$ represents an alkyl group with 11 to 13 carbon atoms.

5. The pressure-sensitive adhesive according to claim 4, wherein the alkyl (meth)acrylate unit has a linear or branched alkyl group with 1 to 10 carbon atoms, and the polar functional group-containing unit is a hydroxy group-containing monomer unit.

6. The pressure-sensitive adhesive according to claim 4, wherein the acrylic copolymer contains the alkyl (meth) acrylate unit in an amount of 10 to 60 wt %.

7. The pressure-sensitive adhesive according to claim 4, wherein the acrylic copolymer contains 80 to 600 parts by weight of the Formula 1 relative to 100 parts by weight of the alkyl (meth)acrylate unit.

8. The pressure-sensitive adhesive according to claim 4, wherein the acrylic copolymer contains 10 to 200 parts by weight of the polar functional group-containing unit relative to 100 parts by weight of the alkyl (meth)acrylate unit.

9. The pressure-sensitive adhesive according to claim 1, wherein the pressure-sensitive adhesive polymer does not contain a monomer unit of Formula 2 below, or contains the monomer unit of Formula 2 below in a ratio of 0.1 wt % or less based on the total weight of the pressure-sensitive adhesive polymer:

[Formula 2]

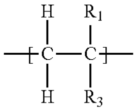

wherein, $R_1$ represents hydrogen or an alkyl group, and $R_3$ is an aromatic ketone group or a (meth)acryloyl group.

10. The pressure-sensitive adhesive according to claim 1, further comprising a radical cross-linking agent.

11. The pressure-sensitive adhesive according to claim 1, which is a cured product of a solventless or syrup pressure-sensitive adhesive composition.

12. A pressure-sensitive adhesive film comprising: a base film; and the pressure-sensitive adhesive of claim 1 formed on one side or both sides of the base film.

13. A flexible device comprising:

a display panel configured to be capable of folding or rolling through folding axis or rolling axis; and the pressure-sensitive adhesive of claim 1 present on one side or both sides of the display panel.

* * * * *